United States Patent
Asanghanwa et al.

(10) Patent No.: US 11,030,280 B2
(45) Date of Patent: Jun. 8, 2021

(54) HARDWARE BASED IDENTITIES FOR SOFTWARE MODULES

(71) Applicant: MICROSOFT TECHNOLOGY LICENSING, LLC, Redmond, WA (US)

(72) Inventors: Eustace Ngwa Asanghanwa, Kirkland, WA (US); Arjmand Samuel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 16/052,463

(22) Filed: Aug. 1, 2018

(65) Prior Publication Data

US 2020/0042675 A1 Feb. 6, 2020

(51) Int. Cl.
*G06F 21/12* (2013.01)
*H04L 9/08* (2006.01)
*H04L 29/06* (2006.01)

(52) U.S. Cl.
CPC .......... *G06F 21/123* (2013.01); *H04L 9/0819* (2013.01); *H04L 9/0866* (2013.01); *H04L 63/123* (2013.01)

(58) Field of Classification Search
CPC ... G06F 21/123; H04L 9/0819; H04L 9/0866; H04L 63/123
See application file for complete search history.

(56) References Cited

U.S. PATENT DOCUMENTS

| | | | | |
|---|---|---|---|---|
| 7,640,427 B2 * | 12/2009 | Callas | ................. | H04L 63/0823 380/277 |
| 8,261,080 B2 * | 9/2012 | Wilkie | ..................... | G06F 21/33 713/175 |
| 9,838,203 B1 | 12/2017 | Kisley et al. | | |
| 10,263,778 B1 * | 4/2019 | Grubin | ................ | H04L 67/1095 |
| 10,461,943 B1 * | 10/2019 | Norum | ....................... | H04L 9/12 |
| 10,615,969 B1 * | 4/2020 | Griffin | .................. | H04L 9/0825 |

(Continued)

FOREIGN PATENT DOCUMENTS

| | | | | |
|---|---|---|---|---|
| CN | 1902561 A | * | 1/2007 | ........... G06F 21/445 |
| CN | 101044490 A | * | 9/2007 | ............. G06F 21/34 |

(Continued)

OTHER PUBLICATIONS

"Attestation Identity Key (AIK) Certificate Enrollment Specification Frequently Asked Questions", Retrieved from https://trustedcomputinggroup.org/wp-content/uploads/IWG-AIK-CMC-enrollment-FAQ.pdf, Sep. 30, 2011, 2 Pages.

(Continued)

*Primary Examiner* — Techane Gergiso
(74) *Attorney, Agent, or Firm* — Holzer Patel Drennan

(57) ABSTRACT

Creating a certificate for a software module. A method includes obtaining a public key for a software module. The method includes obtaining a public key for a software module implemented on a hardware device. The method further includes creating a certificate using the public key by signing the public key using a hardware protected key and hardware protected compute elements. The hardware protected key is protected by a protected portion of the hardware device, and not accessible outside of the protected portion of the hardware device.

15 Claims, 3 Drawing Sheets

(56) References Cited

U.S. PATENT DOCUMENTS

| | | | |
|---|---|---|---|
| 10,693,638 B1* | 6/2020 | Cignetti | H04L 9/3247 |
| 10,855,462 B2* | 12/2020 | Haridas | H04L 9/3263 |
| 2003/0115455 A1* | 6/2003 | Aull | H04L 9/006 |
| | | | 713/156 |
| 2004/0025036 A1* | 2/2004 | Balard | H04L 9/0822 |
| | | | 713/189 |
| 2006/0064582 A1* | 3/2006 | Teal | H04L 63/0823 |
| | | | 713/156 |
| 2007/0055882 A1* | 3/2007 | Gaucas | H04L 9/3268 |
| | | | 713/175 |
| 2008/0016337 A1* | 1/2008 | Morgan | H04L 9/0825 |
| | | | 713/158 |
| 2008/0320308 A1 | 12/2008 | Kostiainen et al. | |
| 2009/0198997 A1* | 8/2009 | Yeap | H04L 63/0823 |
| | | | 713/155 |
| 2011/0010720 A1* | 1/2011 | Smith | G06F 11/3688 |
| | | | 718/102 |
| 2015/0229477 A1* | 8/2015 | Blair | H04L 9/3213 |
| | | | 713/156 |
| 2015/0358313 A1* | 12/2015 | Hussain | H04L 63/0485 |
| | | | 713/173 |
| 2016/0301532 A1* | 10/2016 | Lim | G06F 12/1408 |
| 2017/0078255 A1* | 3/2017 | Nejadian | H04L 63/06 |
| 2018/0062854 A1* | 3/2018 | Kancharla | H04L 9/083 |
| 2018/0091551 A1* | 3/2018 | Palanigounder | G06F 21/00 |
| 2019/0028281 A1* | 1/2019 | Turissini | G09C 1/00 |

FOREIGN PATENT DOCUMENTS

| | | | | |
|---|---|---|---|---|
| CN | 102215488 B | * | 11/2013 | |
| WO | WO-2008061344 A1 | * | 5/2008 | H04L 9/3263 |

OTHER PUBLICATIONS

"International Search Report and Written Opinion Issued in PCT Application No. PCT/US2019/038810", dated Aug. 7, 2019, 13 Pages.

* cited by examiner

HARDWARE BASED IDENTITIES FOR SOFTWARE MODULES

BACKGROUND

Background and Relevant Art

Computers and computing systems have affected nearly every aspect of modern living. Computers are generally involved in work, recreation, healthcare, transportation, entertainment, household management, etc.

In computing systems, there may be a desire to verify software modules. This verification can take a number of different forms. For example, it may be desirable for a software module to have a verifiable identity so that the software module can be verified when it communicates with other local software modules, or other entities external to the system on which the software module is operating. Further, when it comes time to execute a software module, it may be desirable to ensure that the software module has not been tampered with.

The identities of software modules are often based on keys often stored with the modules themselves. In many platforms, especially autonomous devices, these identities are subject to cloning and or impersonation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes obtaining a public key for a software module. The method includes obtaining a public key for a software module implemented on a hardware device. The method further includes creating a certificate using the public key by signing the public key using a hardware protected key and hardware protected compute elements. The hardware protected key is protected by a protected portion of the hardware device, and not accessible outside of the protected portion of the hardware device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein are directed to implementing software modules whose identities are tied to a hardware protected key, which is used by hardware protected compute to create a secure, identity certificate for the modules. In this way, software modules can have their identities protected from cloning and impersonation.

In particular, some embodiments may be configured to prevent spoofing of the identity of a remote connecting software module. For example, a virtual machine, such as a container, may include application modules which have need to make connections to application modules in another virtual machine in the same physical Internet of Things (IoT) device. Alternatively, an application module on a device, or virtual machine in a device may need to communicate with an application module in another IoT device, or to a stand-alone (e.g. constrained) IoT device, or to a cloud endpoint. Embodiments allow certificates to be created at the devices to allow for secure communication.

Alternatively or additionally, embodiments may be implemented to prevent cloning of the identity of modules. Alternatively or additionally, embodiments may be implemented to prevent tamper, misuse or abuse of operations downstream to an identity. For example, some embodiments may thwart attempts to generate JSON web tokens to gain unauthorized access to a resource, or abuse session encryption keys generated from an identity (e.g. via ECDH/E).

As discussed previously, there are mechanisms to provide secured and measured boot to rich operating systems and containing software modules. However, once boot is complete, the modules in memory are vulnerable to side-channel malware injection. Some embodiments illustrated herein include the ability to cryptographically measure a software module's integrity at runtime to detect side-channel malware or fault injection, such as laser probing (i.e., flipping software bits, one at a time to create vulnerabilities).

Figure 1A:
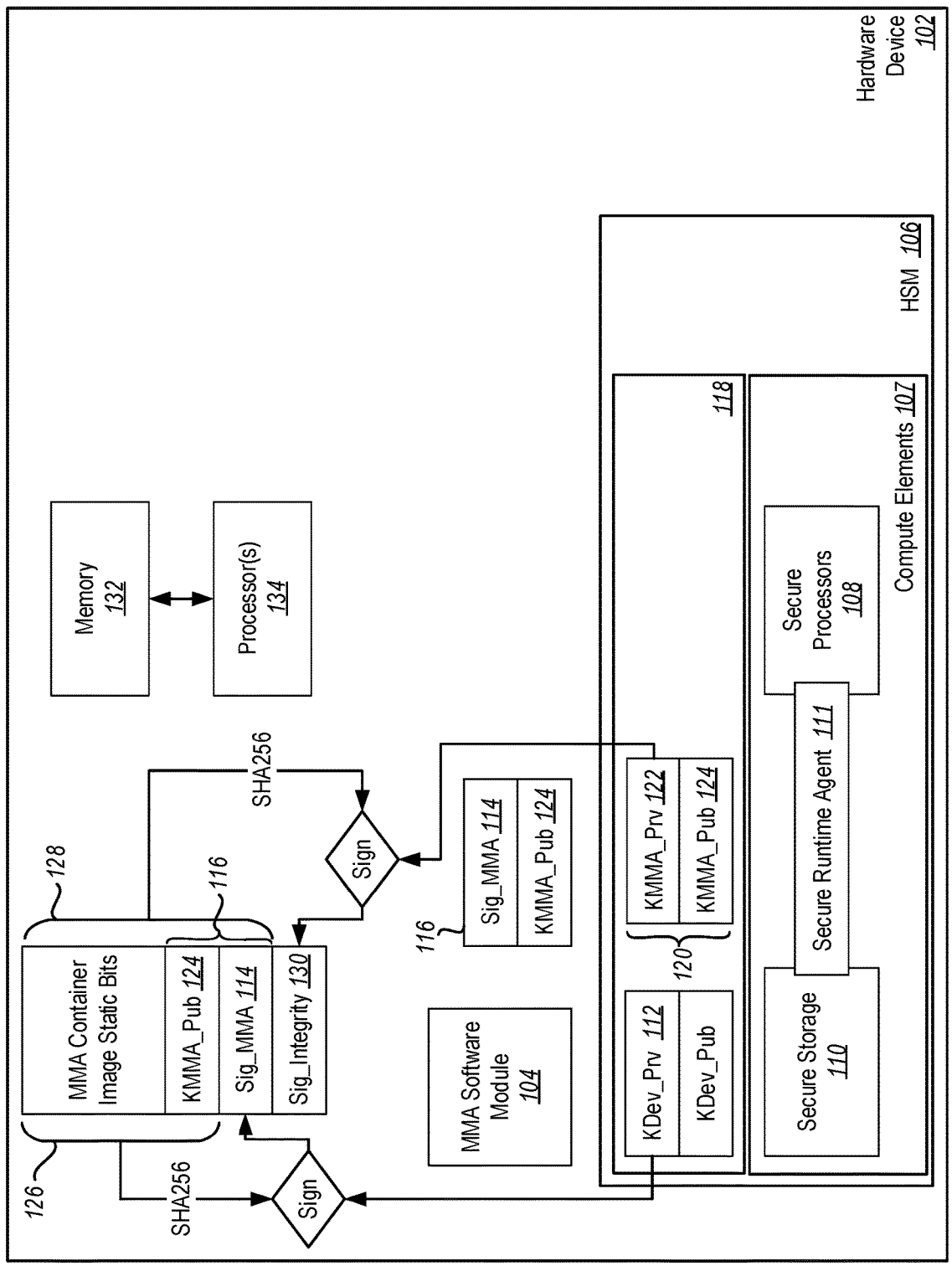
FIG. 1A illustrates creating certificate for a management software module using a hardware protected private key, and hardware protected compute elements.
Figure 1B:
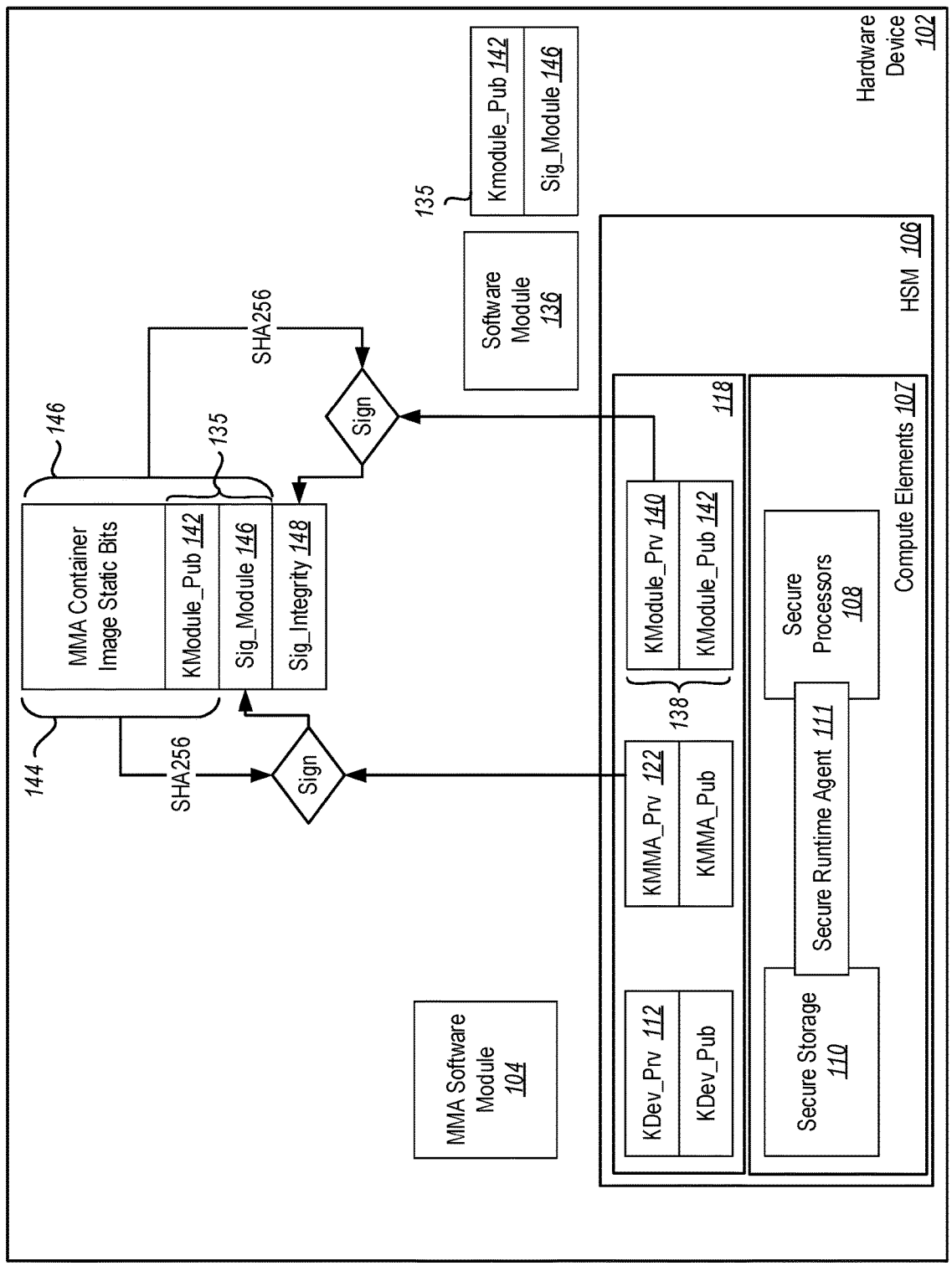
FIG. 1B illustrates creating a certificate of a software module using a private key for a management module and hardware protected compute elements.

Previously, underlying protection keys were stored in the software modules themselves, and were thus vulnerable to direct or side-channel attacks mounted to the software module containing device The following, with reference to FIGS. 1A and 1B, describes a system whereby trust that is rooted in tamper resistant secure hardware is transitioned into a software module. This is done using a tamper resistant secure hardware key 112 (which in this case is a private key of a secure private key/public key pair) and tamper resistant hardware compute elements to create a secure certificate for a software module, e.g., certificate 116 for the Module Management Agent (MMA) software module 104. A certificate generally comprises a signature and public key.

In the example illustrated, a MMA software module 104 has administrative responsibilities over other software modules. The MMA software module 104 has trust based on the secure hardware key 112 and the secure hardware compute elements 107, as will be illustrated in the description of FIG. 1A. The MMA software module 104 transitions the trust to other software modules, as illustrated in the description of FIG. 1B. This causes the root of trust to be in the hardware key 112 and potentially the hardware compute elements 107. However, it should be appreciated that embodiments may be implemented where any software modules can have certificates created using the hardware key 112 and hardware compute elements 107. In particular, it is not necessary to use an MMA software module to transfer trust to other software modules. In some embodiments, any certificate can be created directly using hardware protected keys and hardware protected compute.

Referring now to FIG. 1A, a hardware device 102 is illustrated. The hardware device 102 may be any one of a number of different hardware devices. For example, in some embodiments, the hardware device is an intelligent edge device. An intelligent edge device is a device implementing functionality that is typically implemented in a cloud service. An intelligent edge device is a device where certain functionality from a cloud system is implemented in an appliance device. In particular, certain computing, storage, network, or other functionality that is typically implemented in a cloud system can be moved to an intelligent edge device where the functionality can be utilized as if it were part of the cloud system. For example, analytics, event processing, machine learning, image recognition, and/or artificial intelligence (AI) can be implemented in an intelligent edge device. The intelligent edge device is a physical device comprising processors, storage (such as memory, or mass storage), network devices such as network interface cards, etc. Intelligent edge devices may have a cloud based interface that allows the intelligent edge devices to be remotely monitored and managed. The intelligent edge device can be stored in a given physical location where the resources are located in the given physical location rather than in a nebulous cloud environment. In some embodiments, the intelligent edge device is an Azure IoT Edge device available from Microsoft, Corporation of Redmond, Wash.

These types of devices may be useful for performing cloud-based functionality without the need for transferring large amounts of data. For example, consider a case where a cloud service includes video processing functionality. However, for the cloud service to process video, the video needs to be transferred over a network to a cloud node to have the video processed. In contrast, by implementing an intelligent edge device with the video processing functionality at a camera, the video can be processed with no network overhead directly at the device where the video was produced.

Embodiments are particularly useful in such scenarios. In particular, trusted certificates are often based on keys protected in a cloud service that are not accessible by others. However, by moving cloud functionality to an intelligent edge device, absent the inventive concepts illustrated herein, the keys might be compromised. By protecting the keys in hardware, the same level of security that was achievable on cloud-based systems can be achieved on an intelligent edge device.

The hardware device 102, may alternatively or additionally be an Internet of Things (IoT) enabled device. In particular, IoT devices are physical devices (virtually any physical device) with embedded electronics, such as sensors, processor, and/or communication hardware, such that networks of physical devices can be created to communicate with each other. In IoT, it may be particularly important for devices to be able to securely identify themselves, but can be particularly difficult when there are no protected central authorities to protect identification keys. However, embodiments illustrated herein can address these issues by embedding protected keys in IoT hardware.

Software modules can be implemented on the hardware device 102. For example, FIG. 1A illustrates a software module, which in this example is an MMA software module 104.

The hardware device 102 includes a hardware secure module (HSM) 106. HSM technologies often come in the form of integrated circuits that implement cryptographic algorithms, secure storage mechanisms and simple state machines all in hardware logic—typically with no firmware involved. They are further hardened against physical (e.g. attempted to delayer or probe to read keys) or environmental (e.g. subject to extremes of temperatures, voltage, frequency, light, etc. in hopes of coercing unintended behavior that might be beneficial to an attacker) tampering. They are initially provisioned with keys which they internally manage from there forth, take in inputs to internally derive results from computations involving the keys The HSM 106 is a secure portion of the hardware device 102 which is not accessible to be read by entities external to the HSM 106. In some embodiments, the HSM 106 may be configured such that it can receive input from external entities, but no other entities are able to directly access any elements of the HSM 106, although the HSM can provide certain items to external entities, such as public keys, or the results of various computations performed at the HSM 106. The HSM 106 may be implemented using, for example, a so called Trusted Execution Environment. Alternatively or additionally, the HSM 106 may be implemented using Enclave Trusted Computing Base available from Intel, Corporation of Santa Clara, Calif. Alternatively, other trusted computing elements may be used to implement the HSM 106.

For example, in some embodiments, the HSM includes compute elements 107. The compute elements 107 are typically implemented using state machine logic as discussed above. In some embodiments, the compute elements 107 of the HSM 106 are able to perform primitive commands or actions. For example, the HSM that stores a private key will, using its compute elements, perform cryptographic SIGN (use of the private key) operations within the HSM hardware. In this example, a blob to be signed is delivered to the HSM 106, which returns the signed blob. Some embodiments may be implemented where the compute elements 107 include one or more processor(s) 108 combined with secure storage 110 storing computer-executable instructions that can be executed by the processor(s) 108. In some embodiments, the computer-executable instructions implement a secure runtime agent 111 when executed by the secure processors 108. Neither the processor(s) 108, nor the secure storage 110 are directly accessible by entities external to the HSM 106. However, it should be noted that the secure runtime agent can also be implemented using state machines or other processing hardware.

Note that in some embodiments, the compute elements 107 of the HSM 106 are implemented at a factory at the semiconductor level. That is, these compute elements 107 may be hard coded by semiconductor processing such that there is no possible way to update the compute elements 107 of the HSM 106.

In alternative embodiments, some of the compute elements 107 of the HSM 106 are implemented in firmware and may be updated by a firmware update. However, the HSM is implemented in such a way that the computer-executable instructions can only be replaced, and not read or modified.

In some embodiments, the HSM 106 will allow for a one-time, initial configuration. In some embodiments, this initial configuration stipulates if, and optionally how many times, the internal information of the HSM 106 can be updated through hardware provided commands.

The HSM 106 securely stores hardware protected private keys. In some embodiments, at least some of the keys may be implemented in hardware at manufacture time. For example, in some embodiments, a private key 112, that is the root of trust for all software modules, is implemented on the hardware device 102.

In alternative or additional embodiments, private keys are generated in the hardware device 102, and in particular in the HSM 106.

In either case, knowledge of the private keys does not leave the hardware device 102.

As will be illustrated in more detail below, a certificate can be created by the secure runtime agent 111 using the secure hardware private key 112, or by the MMA software module 104 using certificates previously generated using the secure hardware private key 112. In either case, trust is rooted in the secure hardware private key 112.

Secure certificates may be created for every software module implemented on the hardware device 102. This can be done by a creator which could be the secure runtime agent 111 implemented using the secure processor 108 and secure computer-executable instructions in the secure storage 110, the MMA software module 104, or other elements. This can be done for every software module instance.

The following illustrates two examples of creation of strong certificates (in the current example, X.509 certificates) for software modules. The first example, illustrated in FIG. 1A, is an example where the creator is the secure runtime agent 111 and the software module is the MMA software module 104. The second example, illustrated in FIG. 1B, is an example where the creator is the MMA software module 104, and the software module for which the certificate is being created is another software module. In the example shown in FIG. 1B, trust from the hardware key 112 can be used in the trust chain to subsequent software modules.

Referring now to FIG. 1A, an illustration of creation of a hardware key backed certificate 116 for the MMA software module 104 is shown. The certificate 116 can be used to communicate with other entities, such as other modules in the hardware device 102, or entities external to the hardware device 102. This creation process includes creation of a software module certificate 116 with trust rooted in secure hardware.

In the example illustrated in FIG. 1A, the creator (hereinafter, for this example, the secure runtime agent 111) requests that a public/private keypair be created (and indeed, may create the public/private keypair itself, given its inclusion in the HSM 106) and stored in a secret store 118 of the HSM 106 for a given module. For example, as illustrated in FIG. 1A, the HSM 106, at the request of the secure runtime agent 111, or even using the secure runtime agent 111, creates the public/private keypair 120 for the MMA software module 104, and stores the public/private keypair 120 in the secret store 118.

The HSM 106 creates the MMA software module public/private key pair 120, protectively stores the private key 122 in the secret store 118, and returns the public key 124 to the secure runtime agent 111. Note that in some embodiments, the public key may not need to be returned to the creator, as the creator (as in the case where the creator is the secure runtime agent 111) created the public key.

The secure runtime agent 111 uses the public key 124 as an input to create a TBS (to be signed) digest 126.

The secure runtime agent 111 delivers the TBS digest 126 to the HSM 106 for the HSM to sign with its (i.e., the secure runtime agent's) private key 112, which returns the resulting signature 114. Note that in this example, the secure runtime agent 111 may process the TBS digest 126 itself as part of the HSM 106.

The secure runtime agent 111 uses the signature and MMA software module public key 124 to assemble a certificate 116 for the MMA software module 104.

The secure runtime agent 111 associates the MMA software module certificate 116 with the MMA software module 116, for example as an MMA software module property.

The secure runtime agent 111 hashes the MMA software module 104 static bits with the certificate 116 to create an MMA software module integrity digest 128.

The secure runtime agent 111 delivers MMA software module integrity digest 128 to the HSM 106 to sign (or signs it itself as part of the HSM 106) using the MMA software modules private key 122 which returns the resulting signature as an MMA software module integrity signature 130.

The secure runtime agent 111 associates the MMA module integrity signature 130 with the MMA software module 104, for example, by associating it as a property.

Note that the preceding illustrates actions that might be taken in conjunction with actions to obtain the MMA software module 104 for the hardware device 102. In particular, in some embodiments, the MMA software module 104 may be obtained from a software source, such as an app store or other software repository. As a result of obtaining the MMA software module 104, the preceding actions illustrated in the description of FIG. 1A may be performed, before the MMA software module 104 is loaded into memory 132 at the hardware device 102, for execution by processor(s) 134 at the hardware device 102, to create a certificate 116 for use by the MMA software module 104 to communicate with other modules.

In conjunction with the MMA software module 104 being loaded in to memory 132 on the hardware device 134, the MMA software module integrity signature 130 can be used to ensure that the MMA software module 104 has not been changed, either intentionally or inadvertently.

Referring now to FIG. 1B, an illustration of creation of a hardware key backed certificate 135 for the software module 136 is shown. The certificate 135 can be used to communicate with other entities, such as other modules in the hardware device 102, or entities external to the hardware device 102. This creation process includes creation of a software module certificate 135 with trust rooted in secure hardware.

In the example illustrated in FIG. 1B, the creator (hereinafter, for this example, the MMA software module 104) requests that a public/private keypair be created and stored in a secret store 118 of the HSM 106 for a given module. For example, as illustrated in FIG. 1B, the HSM 106, at the request of the MMA software module 104, creates the public/private keypair 138 for the software module 136, and stores the public/private keypair 138 in the secret store 118.

The HSM 106 creates the software module public/private key pair 138, protectively stores the private key 140 in the secret store 118, and returns the public key 142 to the MMA software module 104.

The MMA software module 104 uses the public key 124 as an input to create a TBS (to be signed) digest 144.

The MMA software module 104 delivers the TBS digest 144 to the HSM 106 for the HSM to sign with its (i.e., the MMA software module's) private key 122, which returns the resulting signature 146.

The MMA software module 104 uses the signature 146 and software module public key 142 to assemble a certificate 135 for the software module 136.

The MMA software module 104 associates the software module certificate 135 with the software module 136, for example as a software module property.

The MMA software module 104 hashes the software module 136 static bits with the certificate 135 to create a software module integrity digest 146.

The MMA software module 104 delivers software module integrity digest 146 to the HSM 106 to sign using the software modules private key 140 which returns the resulting signature as a software module integrity signature 148.

The MMA software module 104 associates the module integrity signature 148 with the software module 136, for example, by associating it as a property.

Note that the preceding illustrates actions that might be taken in conjunction with action to obtain the software module 136 for the hardware device 102. In particular, in some embodiments, the software module 136 may be obtained from a software source, such as an app store or other software repository. As a result of obtaining the software module 136, the preceding actions illustrated in the description of FIG. 1B may be performed, before the software module 136 is loaded into memory 132 at the hardware device 102, for execution by processor(s) 134 at the hardware device 102, to create a certificate 135 for use by the software module 136 to communicate with other modules.

In conjunction with the software module 136 being loaded in to memory 132 on the hardware device 134, the software module integrity signature 148 can be used to ensure that the software module 136 has not been changed, either intentionally or inadvertently.

The following illustrates various components and design elements to be implemented for implementing some embodiments. Embodiments may require HSM technology.

Embodiments may require a secret store, such as the secret store 119. The secret store is a hardware secured secret store that is not able to be read by external entities external to the HSM.

As illustrated above, some embodiments may include functionality to instantiate and provision the MMA software module with X.509 certificate identity. In particular, a secure runtime agent includes functionality to instantiate, validate, and provision the MMA software module with STRONG X.509 identity. The secure runtime agent, in some embodiments, is be equipped with information on how to obtain the MMA software module. For example, the secure runtime agent may have access to information identifying endpoints where the MMA software module can be obtained for installation on a device.

The secure runtime agent includes certain functionality.

For example, the secure runtime agent validates and instantiates the MMA software module.

Alternatively, or additionally, the secure runtime agent requests the HSM and/or the secret store to create X.509 certificate for the MMA software module.

Alternatively, or additionally, the secure runtime agent associates the X.509 certificate with the MMA software module.

Alternatively, or additionally, the secure runtime agent requests the HSM and/or the secret store to create an MMA software module integrity signature.

Alternatively, or additionally, the secure runtime agent associates the MMA software module integrity signature with the MMA software module.

In some embodiments, the MMA may include a device agent that allows the hardware device 102 to be registered in an IoT or other device network.

The MMA software module is configured to instantiate and provision other software modules with X.509 (or other appropriate) certificate identities. In particular, in some embodiments, the MMA software module instantiates, validates, and provisions other software modules with strong X.509 (or other appropriate) identities. The MMA software module is equipped with information on how to obtain and validate respective software modules.

To accomplish this, the MMA software module includes certain functionality.

In particular, the MMA software module validates and instantiates other software modules.

Alternatively or additionally, the MMA software module requests the HSM or secret store to create X.509 certificates for software modules.

Alternatively or additionally, the MMA software module associates X.509 certificates with software modules.

Alternatively or additionally, the MMA software module requests the HSM or secrets store to create software module integrity signatures.

Alternatively or additionally, the MMA software module associates the module integrity signatures with the software modules.

Thus, as illustrated above, some embodiments are implemented where keys are generated inside tamper-resistant silicon, where private keys never leave. cryptographic methodologies are used to associate software modules to the keys and generate certificate identities from this association. A usage model is offered that grants use of software module keys stored in the HSM without revealing the confidentiality of the private keys. Further, the usage model offers a mechanism to detect compromise of the software module (e.g. malware injection) and prevent access to the key.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
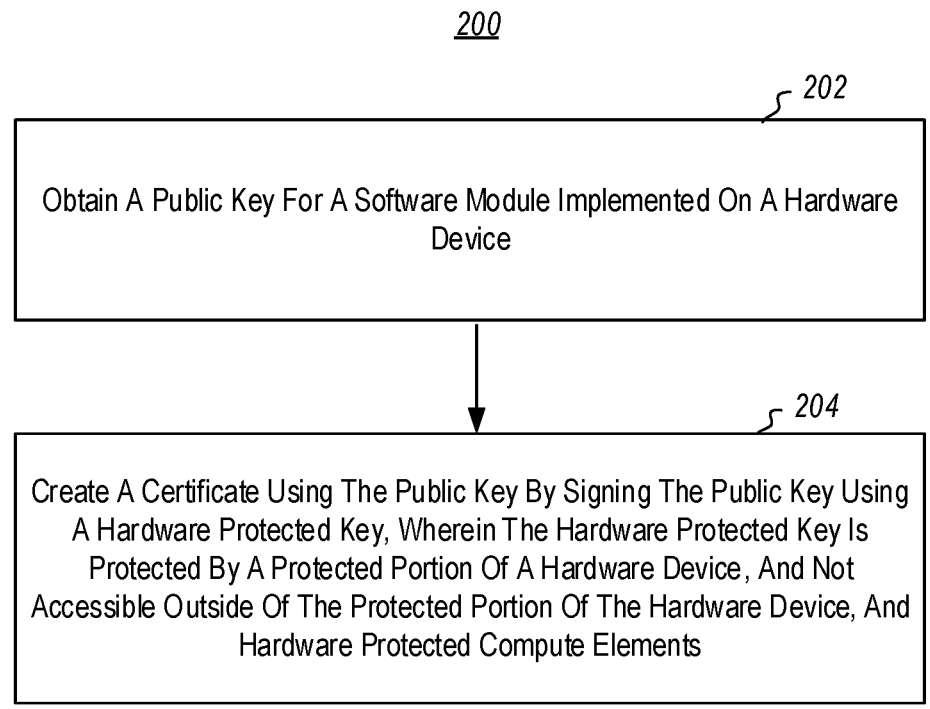
FIG. 2 illustrates a method of creating a certificate for a software module.

Referring now to FIG. 2, a method 200 is illustrated. The method 200 includes acts for creating a certificate for a software module. The method includes obtaining a public key for a software module implemented on a hardware device (act 202).

The method 200 further includes creating a certificate using the public key by signing the public key using a hardware protected key, wherein the hardware protected key is protected by a protected portion of the hardware device, and not accessible outside of the protected portion of the hardware device, and hardware protected compute elements (act 204).

In some embodiments, the method 200 may be practiced where the software module comprises a Module Management Agent (MMA) software module. In some such embodiments, the method 200 may further include obtaining a different public key for a different software module and creating a certificate using a private key for the MMA software module, wherein the private key for the MMA software module is protected by the protected portion of the hardware device, and not accessible outside of the protected portion of the hardware device, and the hardware protected compute elements.

The method 200 may be practiced where the certificate is an X.509 certificate.

The method 200 may further include creating an integrity digest, the integrity digest comprising a hash of static bits of the software module and the and the certificate, signing the integrity digest using a hardware protected private key for the application at the hardware device to create an integrity signature, and associating the integrity signature with the software module. In some such embodiments, associating the integrity signature with the software module comprises associating the integrity signature as a property of the software module. Some embodiments of the method 200 may include using the integrity signature to verify the software module in conjunction with loading the software module into memory of the hardware device.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions for executing a computer process comprising:
   obtaining a public key for a first software module implemented on a hardware device, the first software module comprising a Module Management Agent (MMA) software module; and providing the public key to a hardware secure module (HSM) of the hardware device;
receiving a signature from the HSM, the signature being based on the public key and further based on a hardware protected key for the MMA software module, wherein the hardware protected key for the MMA software module is stored within the HSM at a location inaccessible to read entities external to the HSM;
creating a certificate for the first software module using the public key, the signature, and the hardware protected key for the MMA software module;
obtaining a different public key for a second software module; and
using the certificate as a verifiable identify for the first software module when the first software module is communicating with the second software module.

2. The computer system of claim 1, wherein the certificate is an X.509 certificate.

3. The computer system of claim 1, wherein one or more computer-readable media further have stored thereon instructions that are executable by the one or more processors to configure the computer system to perform at least the following:
creating an integrity digest, the integrity digest comprising a hash of static bits of the first software module and the certificate;
signing the integrity digest using the hardware protected private key for the first software module at the hardware device to create an integrity signature; and
associating the integrity signature with the first software module.

4. The computer system of claim 3, wherein associating the integrity signature with the first software module comprises associating the integrity signature as a property of the first software module.

5. The computer system of claim 3, wherein one or more computer-readable media further have stored thereon instructions that are executable by the one or more processors to configure the computer system to use the integrity signature to verify the first software module in conjunction with loading the first software module into memory of the hardware device.

6. The computer system of claim 1, wherein the instructions are further executable to:
transmit a request to the HSM to generate a public/private key pair for the first software module.

7. A method comprising:
obtaining a public key for a first software module implemented on a hardware device, the first software module including a Module Management Agent (MMA) software module;
providing the public key to a hardware secure module (HSM) of the hardware device;
receiving a signature from the HSM, the signature being based on the public key and further based on a hardware protected key for the MMA software module, wherein the hardware protected key for the MMA is stored within the HSM at a location inaccessible to read entities external to the HSM;
creating a certificate for the first software module using the public key, the signature, and the hardware protected key for the MMA software module;
obtaining a different public key for a second software module; and
using the certificate as a verifiable identify for the first software module when the first software module is communicating with the second software module.

8. The method of claim 7, wherein the certificate is an X.509 certificate.

9. The method of claim 7, further comprising:
creating an integrity digest, the integrity digest comprising a hash of static bits of the first software module and the certificate;
signing the integrity digest using the hardware protected private key for the first software module at the hardware device to create an integrity signature; and
associating the integrity signature with the first software module.

10. The method of claim 9, wherein associating the integrity signature with the first software module comprises associating the integrity signature as a property of the first software module.

11. The method of claim 9, further comprising using the integrity signature to verify the first software module in conjunction with loading the first software module into memory of the hardware device.

12. A hardware device comprising:
a hardware secure module (HSM);
a hardware protected secret store, wherein the hardware protected secret store comprises a hardware protected key, and wherein the hardware protected secret store is stored within the hardware secure module (HSM) at a location inaccessible to read entities external to the HSM; and
hardware protected compute elements in the HSM comprising secure storage and secure processors, wherein the hardware protected compute elements are configured to execute a computer processing comprising:
obtaining a public key for a first software module implemented on the hardware device, the first software module comprising a Module Management Agent (MMA) software module, wherein the hardware protected key is a hardware protected key for the MMA;
providing the public key to the hardware secure module (HSM) of the hardware device;
receiving a signature from the HSM, the signature being based on the public key and further based on the hardware protected key for the MMA; and
creating a first certificate for the first software module using the public key, the signature, and the hardware protected key for the MMA software module;
obtaining a different public key for a second software module; and
using the first certificate as a verifiable identify for the first software module when the first software module is communicating with the second software module.

13. The hardware device of claim 12, wherein the certificate is an X.509 certificate.

14. The hardware device of claim 12, wherein the hardware protected compute elements are further configured to:
create an integrity digest, the integrity digest comprising a hash of static bits of the first software module and the certificate;
sign the integrity digest using the hardware protected private key for the first software module at the hardware device to create an integrity signature; and
associate the integrity signature with the first software module.

15. The hardware device of claim 14, wherein associating the integrity signature with the first software module comprises associating the integrity signature as a property of the first software module.

\* \* \* \* \*